June 27, 1961

K. R. MORRIS 2,990,531

MEANS PRODUCING VARIABLE HEIGHT PULSES
UNDER CONTROL OF INPUT VOLTAGE
EXCEEDING PRESELECTED MINIMUM

Filed Feb. 24, 1959

INVENTOR.
KENNETH ROBERT MORRIS
BY
FINN G. OLSEN
ATTORNEY

United States Patent Office 2,990,531

Patented June 27, 1961

2,990,531

MEANS PRODUCING VARIABLE HEIGHT PULSES UNDER CONTROL OF INPUT VOLTAGE EXCEEDING PRESELECTED MINIMUM

Kenneth Robert Morris, Ann Arbor, Mich., assignor, by mesne assignments, to Micrometrical Manufacturing Company, Ann Arbor, Mich., a corporation of Delaware Filed Feb. 24, 1959, Ser. No. 794,879
3 Claims. (Cl. 328—171)

Figure 1:
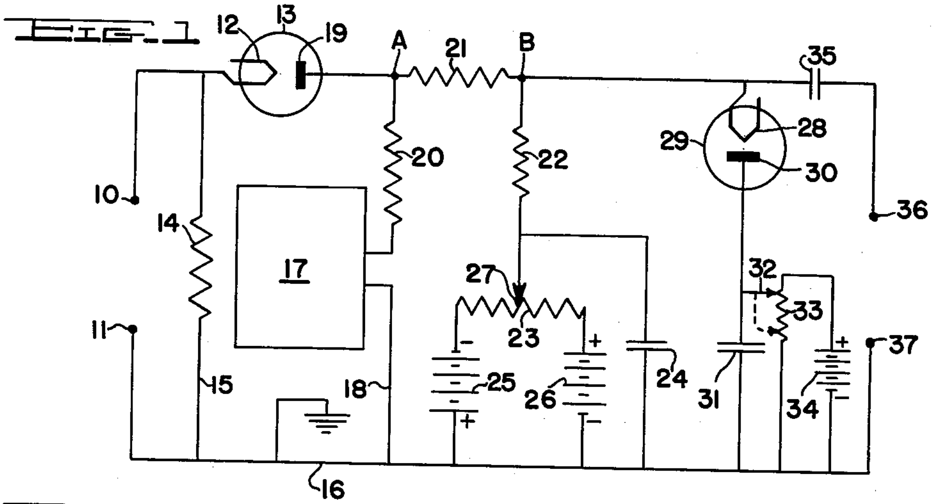

This invention relates to electronic signal detecting devices, and more particularly to such devices which are responsive to a signal greater than a given magnitude and are adapted to translate the presence of the signal into the presence or absence of a second electrical stimulus of a different character.

It is an object of the present invention to provide a device characterized by its ability to translate electrical signals exceeding a threshold value and of desired electric polarity to a second signal of a pulsed nature, and with the duration and frequency of the pulses being independent of the magnitude of the input signal.

It is another object of the present invention to provide automatic electronic means for continual supervision of an electric circuit in such a way that the output signal exists when the input signal exceeds a given magnitude and may be used to control auxiliary circuits to effect the control of the electric stimulating condition.

Another object of the present invention is to provide a device to accomplish the foregoing without the need for complex and expensive circuitry, thus enabling the present limit detecting circuit to be added to electronic apparatus needful of its characteristics without excessive expense.

Still another object of the present invention is to provide a means for translating a low frequency signal into a high frequency series of pulses which will submit to amplification with simple amplifying circuitry, thus obviating the problem of difficult low frequency amplification circuits.

A further object of the present invention is to provide a means for using conventional and simple amplification circuits for amplifying zero frequency signals.

For purposes of clarity, the present invention has been described as applied to a limit detecting device used for detecting the presence of a low frequency signal in excess of a predetermined value. The purpose in selecting this application of the invention is for simplicity of explanation and is not to be considered as limiting the scope or the nature of the invention, it being apparent that persons skilled in the electronic arts will have other applications of the invention not mentioned particularly in this description.

Other objects of this invention will appear in the following description and appended claims, reference being had to the accompanying drawings forming a part of this specification wherein like reference characters designate corresponding parts in the several views.

Figure 2:
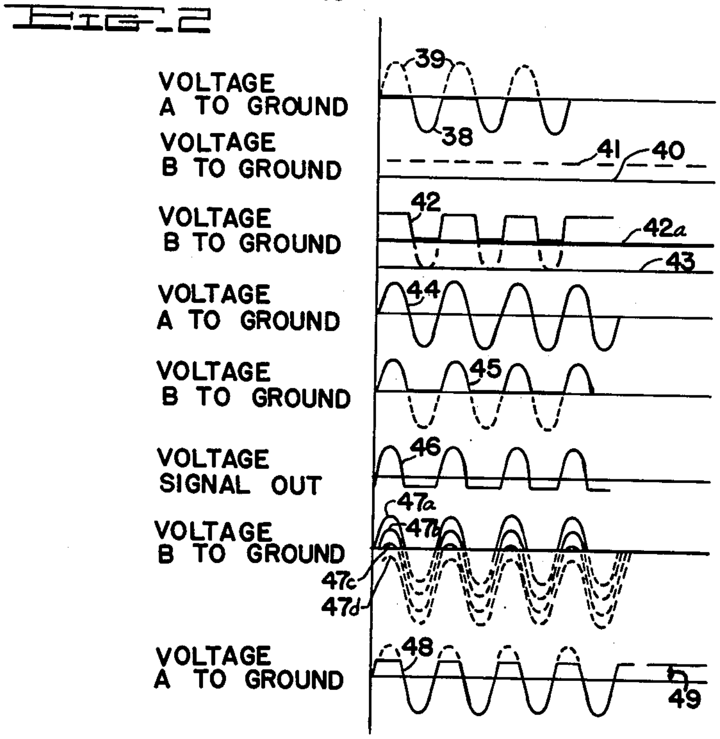

Referring to the drawing:

FIGURE 1 is a schematic diagram of an electronic embodiment of the present invention; and FIGURE 2 is a time sequence diagram of the voltages and currents found at various points in the electronic circuitry shown in FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1 of the drawing, terminals 10 and 11 are provided as access points for the input signal to the invention. A conductor proceeds from terminal 10 to the cathode 12 of the diode 13. Also attached to cathode 12 is resistance 14 which provides via conductor 15 a relatively low impedance conducting path from cathode 12 to ground conductor 16. Oscillator 17 is provided as the source of pulses which will be manipulated by the signal input. Oscillator 17 is connected to the ground conductor 16 by conductor 18 and to the anode 19 of diode 13 by resistance 20. The resistance 20 is selected to have a large value so that the oscillator 17 appears as a constant current generator. One terminal of resistance 21 is connected to anode 19 and resistance 20, and the other terminal of resistance 21 is connected to circuit terminal B. For purposes of descriptive ease, the junction of the diode 13, anode 19, resistance 21, and resistance 20 is labeled terminal A. Resistance 22 is connected between terminal B and the variable contact 27 of potentiometer 23 and also to condenser 24. The end terminals of potentiometer 23 are connected to the ground conductor 16 through the batteries 25 and 26 thus forming a potential bridge circuit. It will be noted that the polarities of the batteries 25 and 26 are arranged so that the variable terminal 27 of the potentiometer 23 is at ground or conductor 16 potential when it is electrically midway between the two ends of the potentiometer winding 23. Also attached at terminal B is the cathode 28 of diode 29. The anode 30 of diode 29 is connected to the ground conductor 16 through condenser 31. The anode 30 of diode 29 is also connected to the variable contact 32 of potentiometer 33. A potential difference is maintained across the potentiometer 33 by battery 34. It will be noted that the potential polarity of battery 34 is such that its negative terminal is conneced to ground conductor 16. Also connected to the cathode 28 of diode 29 is condenser 35. The signal output terminals 36 and 37 are connected to the condenser 35 and ground conductor 16 respectively.

To aid the description of the functions of the various parts of the invention, the operation of the circuitry shown in FIGURE 1 will be explained first in the absence of a signal applied to the terminals 10 and 11. In addition, although the diodes 13 and 29 have not been specifically described, it will be asumed that the diodes are conducting when the anodes are positive in potential relationship to their cathodes and, when conducting, with a negligibly small internal resistance. In addition, it will be understood that the diodes will not be conducting when their cathodes are positive with respect to the anode and that their internal resistance under this circumstance may be taken to be that of an open circuit. Thus, the manipulation of the relative potentials between the diode, cathodes and anodes provide means for affecting the electrical operating conditions of the diodes. The oscillator 17 may or may not be a variable frequency oscillator at the will of the user. For non-ambiguous operation of the device, however, it is necessary that the frequency of the oscillator be higher than the frequency of the input signal. Thus, were the input signal to be of the order of 10 cycles per second, the user would find it convenient, but not essential, to have the oscillator 17 operating at approximately 1000 cycles.

With the oscillator 17 in operation, the voltage observed at point A with respect to ground conductor 16 is as shown in curve 38 in FIGURE 2. It will be noted that curve 38 depicts a series of negative pulses. The negative pulses are created by the clipping of the positive pulses shown in dotted lines at 39. The clipping of the positive pulses occurs because the anode 19 of diode 13 is forced to go positive with respect to the cathode 12 of diode 13 for each positive wave of the oscillatory output of oscillator 17. When the anode 19 is positive with respect to the cathode 12 the circuit at point A is presented with a low resistance circuit to ground conductor 16 through resistance 14, and thus, may maintain a relatively constant current flow condition without the maintenance of a sensible voltage which would ordinarily be the case were diode 13 not conducting. The negative pulses which appear at A also appear at B. The magnitude of the negative pulses at B are lesser in magnitude than those appearing at A by reason of the voltage drop that will appear across resistor 21. The voltage drop across resistor 21 is a function of the impedance of the circuit at B to the ground conductor 16. Thus, if the diode 29 is non-conducting for all conditions of potential at B, then the impedance to ground at B will be that of the path through resistance 22 and associated potentiometric circuits. Resistance 22 is usually selected to have a large value yet one suitable for conveying the potentiometric adjustments of potentiometer 23 to the cathode 28 of diode 29. In the present instance, if the variable contact 27 is adjusted so that a zero potential relative to ground conductor 16 is applied to cathode 28 of diode 29, and if the potentiometer 33 is so adjusted as to apply any zero or positive potential to the anode 30 of diode 29, then the negative pulses appearing at B will find a low impedance path to ground conductor 16 through diode 29, condenser 31, and potentiometer 33, and the entire negative pulse appearing at A will appear across resistance 21, and thus, the voltage at B, with respect to ground, will remain at zero. There being no voltage excursion at B, condenser 35 will be unable to deliver a signal to the signal output terminals 36 and 37. Thus, a plot of the voltage at B, with respect to ground, will show a substantially zero voltage condition existing as shown by straight line 40.

If the potentiometer selection terminal 27 is adjusted so that a small negative potential is applied to the cathode 28 of diode 29 through resistance 22, the potential at B, with respect to ground conductor 16, remains at zero since diode 29 represents a low resistance path to ground when potentiometer terminal 32 is in the position shown in broken lines at 32*a*. If potential connection 27 of potentiometer 23 is shifted to the positive end of the potentiometer, point B will raise to a positive potential with respect to ground conductor 16 since diode 29 will become non-conducting the instant its cathode 28 assumes a positive potential with respect to its anode 30. Under this circumstance, the potential plot at B with respect to ground conductor 16, will assume a positive potential shown in line 41 of FIGURE 2.

If potentiometer connection 27 is adjusted to maintain a zero potential with respect to conductor 16, but potentiometer connection 32 is adjusted to maintain a small positive voltage applied to the anode 30 of diode 29, then point B will likewise assume a small positive potential with respect to ground conductor 16 inasmuch as the potential drop across the diode 29 under conditions of conduction may be taken as negligibly small. It has been found desirable to provide a small positive bias to diode 29 in the fashion shown using potentiometer 33 in order to avoid the transmission of unwanted signals to the output signal terminals 36 and 37. Such unwanted signals are inadvertent noise voltage or switching transients of a small or minor nature and which are unwanted at the signal output terminals.

During that condition of diode 29 bias such that its cathode 28 is positive with respect to its anode 30, the diode will represent a high impedance to ground for any signal appearing at B. Thus, the negative pulses at A will traverse resistance 21 and appear at B causing B to assume a potential which is the sum of any bias potentials applied to it by potentiometer 23 and any signals which arrive at B via resistance 21 and occurring at A. A plot of this condition of potential at B to ground is shown in curve 42 of FIGURE 2. It will be seen that the constant D.C. potential of B to ground shown in curve 41, which is the condition for no oscillator signal appearing at A, has now been modified to show the constant D.C. potential modified by a series of pulsed potential adjustments at B which drive the potential of B toward the zero axis 42*a*. If the potential pulses are sufficient to cause the potential at B to go below zero in such a fashion that the potential at B would have a negative relationship with respect to ground conductor 16, then diode 29 becomes conducting and presents a low impedance circuit to ground and holds point B at a zero potential with respect to conductor 16 for all parts of the signal pulse which attempt to drive point B to a potential below or negative with respect to conductor 16.

If, on the other hand, potential connection 27 is arranged so that a slight negative bias is applied to the cathode 28 of diode 29 then any negative signal pulses arriving at B will find a low impedance circuit to ground through the diode 29 by virtue of its condition of conduction and the curve 43 then is the condition observed at point B.

From the preceding it can be seen that under conditions of zero signal input and the proper manipulation of controls 27 and 32, that no signal output appears even though oscillator 17 is in operating condition. An oversimplification of the explanation of the circuit of FIGURE 1 would be to say that during conditions of no signal input the oscillator 17 finds its positive half cycles effectively short circuited by diode 13, and the signal output circuit at 37 and 36 is effectively short circuited by diode 29 for all negative half cycles of oscillator 17.

Assume now that a signal is applied to input terminals 10 and 11, the reaction of the circuit under such a circumstance will be observed. The signal to be applied will be a D.C. voltage arranged so that the terminal 10 assumes a positive potential with respect to terminal 11.

When terminal 10 assumes a positive potential with respect to terminal 11, the cathode 12 of diode 13 becomes positively biased with respect to its anode 19. For purposes of simplicity of explanation, it will be stated that the magnitude of the positive signal applied to terminal 10 is greater than the magnitude of the oscillator signal appearing at point A. Under this circumstance the positive half wave of the oscillator signal voltage at A, which was previously clipped as shown in curve 38 of FIGURE 2, no longer finds a low impedance circuit to ground through diode 13, and point A is therefore permitted to follow the signal of oscillator 17 as shown in curve 44 of FIGURE 2. It will be noted that point A now displays the full oscillatory wave created by oscillator 17. The point B reacts to the full wave signal from A by causing all negative voltage excursions to be conducted to ground via diode 29. On the other hand, positive excursions at B induced by the oscillator 17 cause the cathode 28 of diode 29 to assume a positive potential with respect to its anode 30 and, thus, causes diode 29 to become non-conducting. At the instant of becoming non-conducting, further positive excursions of B with respect to conductor 16 no longer find a low impedance circuit to ground through the diode 29 and, thus, point B now follows the potential of point A in accordance with the dictates of the new high impedance condition of the circuit from point B to ground conductor 16 caused by the disappearance of the low impedance path of diode 29. Under this circumstance, a series of positive pulses 45 appear at point B. Similarly, the alternating component of the signal 45 appears at the signal output terminals 36 and 37 as shown in curve 46 of FIGURE 2.

Manipulation of potentiometer connection 27 in a negative direction will cause the signal voltage at B with reference to conductor 16 to change in fashion shown in curves 47*a*, 47*b*, 47*c*, 47*d*, of FIGURE 2. It will be observed that a sufficiently great negative bias may be applied to the cathode 28 of diode 29 that no signal survives at B. On the other hand as the negative bias is decreased the peak positive excursions of the signal at B begin to appear as they become more and more successful in overcoming the negatively biased cathode, and therefore conducting condition, of diode 29.

It has been found in the operation of the invention that it is desirable to maintain a small negative bias on the cathode 28 of diode 29 by means of potentiometric control 23 and, similarly, a small positive bias on the anode of diode 29 by means of potentiometer 33. When so adjusted and with a signal applied to terminal 10 whose positive value is greater than the peak positive value of the oscillator 17 signal at A, then substantially all of the positive half wave signal from oscillator 17 appears at point B and is available as signal output at terminals 36 and 37.

It will be observed in curve 44 of FIGURE 2 that the entire oscillator signal appears at point A with respect to ground when the signal input is greater in magnitude than the oscillator signal appearing at point A. Should the signal input decrease to some value such that the anode 19 of diode 13 is positive with respect to its cathode 12 during some part of the oscillatory voltage applied to the anode 19 then the potential at A is incapable of increasing under the compulsion of the oscillator 17 to any value which is greater in potential than the signal input. Under this circumstance, the curve 44 is modified under the influence of the input signal to assume a shape as shown in curve 48 in which all positive portions of the oscillator signal at A which have a value greater than the signal input 49 cause a low impedance path to appear across diode 13, thus restricting all positive excursions of point A to be limited to the value of the signal. It may be observed from a study of curves **47*a*, 47*b*, 47*c* of FIGURE 2 that the potentiometric control 23 may be so adjusted as to cause no positive pulse to appear at point B for all values lesser than any desired level of signal voltage. From a consideration of curves 48 and 47, it may thus be seen that the described device may be used as a means for electronically revealing a condition of signal input to terminals 10 and 11** having any value in excess of a predetermined value.

Although the circuit of FIGURE 1 has been described as producing positive pulses for signal inputs in excess of a preselected value, the same circuit may be used to produce negative pulses by the reversal of diodes 13 and 29 and suitable manipulation of the potentials delivered by potentiometers 23 and 33, and it is to be understood that the present invention embodies both arrangements.

While the invention has application as a means for indicating the magnitude of an input signal, it will be apparent to those skilled in the art that the device has numerous applications. Thus, the output pulses which exist for that condition of signal input greater than a predetermined level may be used to create a corrective manipulation of either the signal input level or the adjustment of potentiometer 27 by means of either mechanical or electronic methods to accomplish a controlling feed-back loop for the automatic manipulation of a process or a device.

In addition, potentiometer 23 may be adjusted to permit positive pulses from oscillator 17 to appear at the signal output terminal for all conditions of signal input. Under this circumstance the device may be used as a process time integrator by simply counting the number of pulses so produced, it being arranged that a suitable input signal is applied to the input terminals when the process under inspection is in operation.

Having thus described my invention, I claim:

1. An electronic device comprising a pair of input and a pair of output terminals; a constant current oscillator and a first diode in series across said input terminals, said first diode being connected so as to permit current flow normally only in a given direction; a resistance connected in parallel with said input terminals to provide a low impedance return circuit for given polarity excursions of said oscillator; a series circuit including a relatively high resistance, a second diode and a direct current blocking element connected to the terminals of said oscillator, said second diode positioned to prevent the appearance of opposite polarity voltage at said output terminals; a second series circuit comprising a condenser, said output terminals in parallel with said second diode, and said direct current blocking element; a bias potential and polarity adjusting circuit in parallel with said second diode and said direct current blocking element; and a potential adjusting circuit in parallel with said direct current blocking element.

2. An electronic device as is claimed in claim 1 wherein said bias potential and polarity adjusting circuit comprises a potential bridge circuit.

3. An electronic device as is claimed in claim 1 wherein said potential adjusting circuit comprises a potentiometer circuit.

References Cited in the file of this patent

UNITED STATES PATENTS

| | | |
|---|---|---|
| 2,401,404 | Bedford | June 4, 1946 |
| 2,406,978 | Wendt et al. | Sept. 3, 1946 |
| 2,802,167 | Cooper | Aug. 6, 1957 |

OTHER REFERENCES

Waveforms (Chance et al.), Radiation Lab. Series, Vol. 19, pub. by McGraw-Hill Co., 1949 (pages 370–373).